United States Patent Office 2,756,368
Patented July 24, 1956

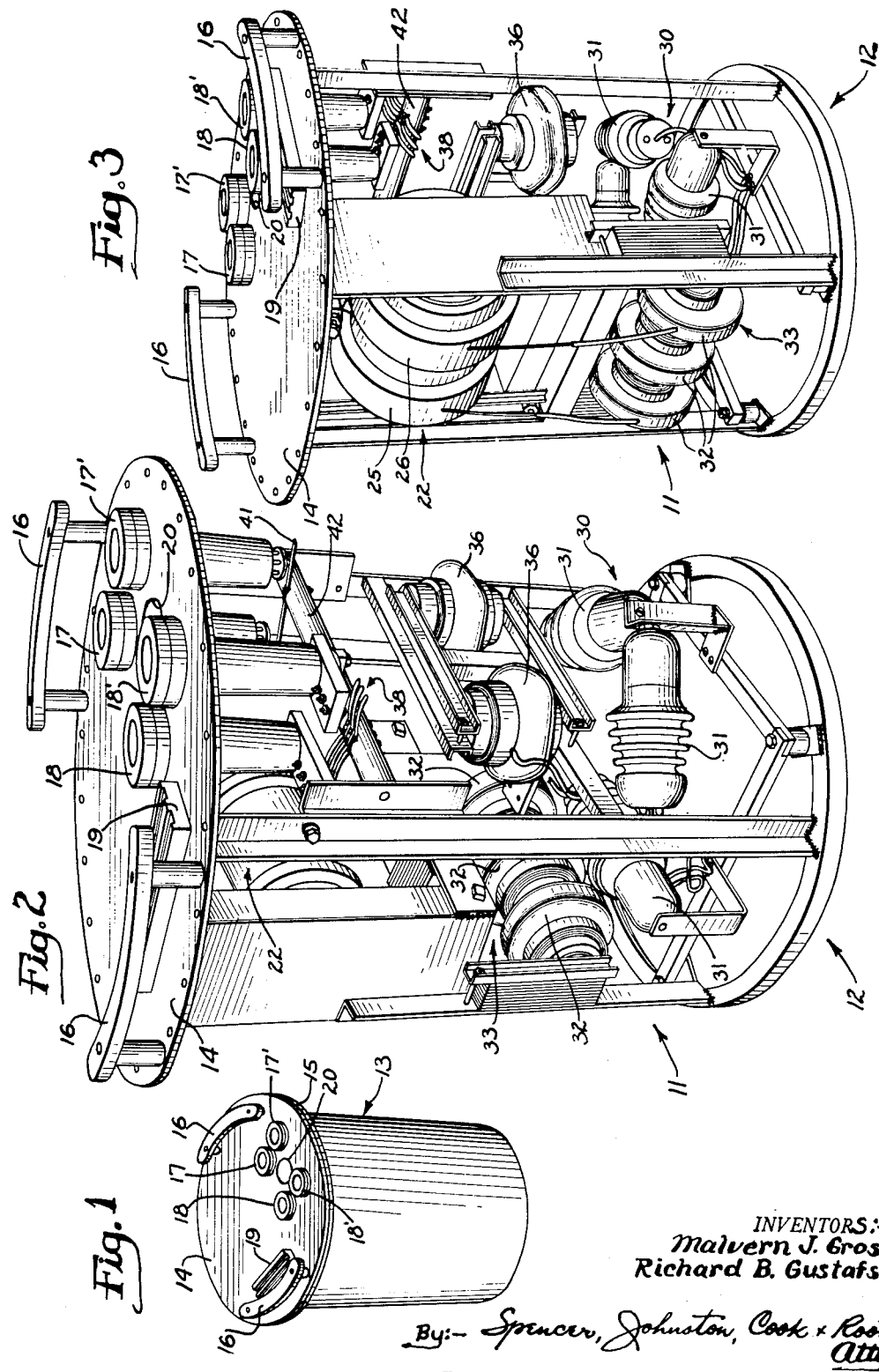

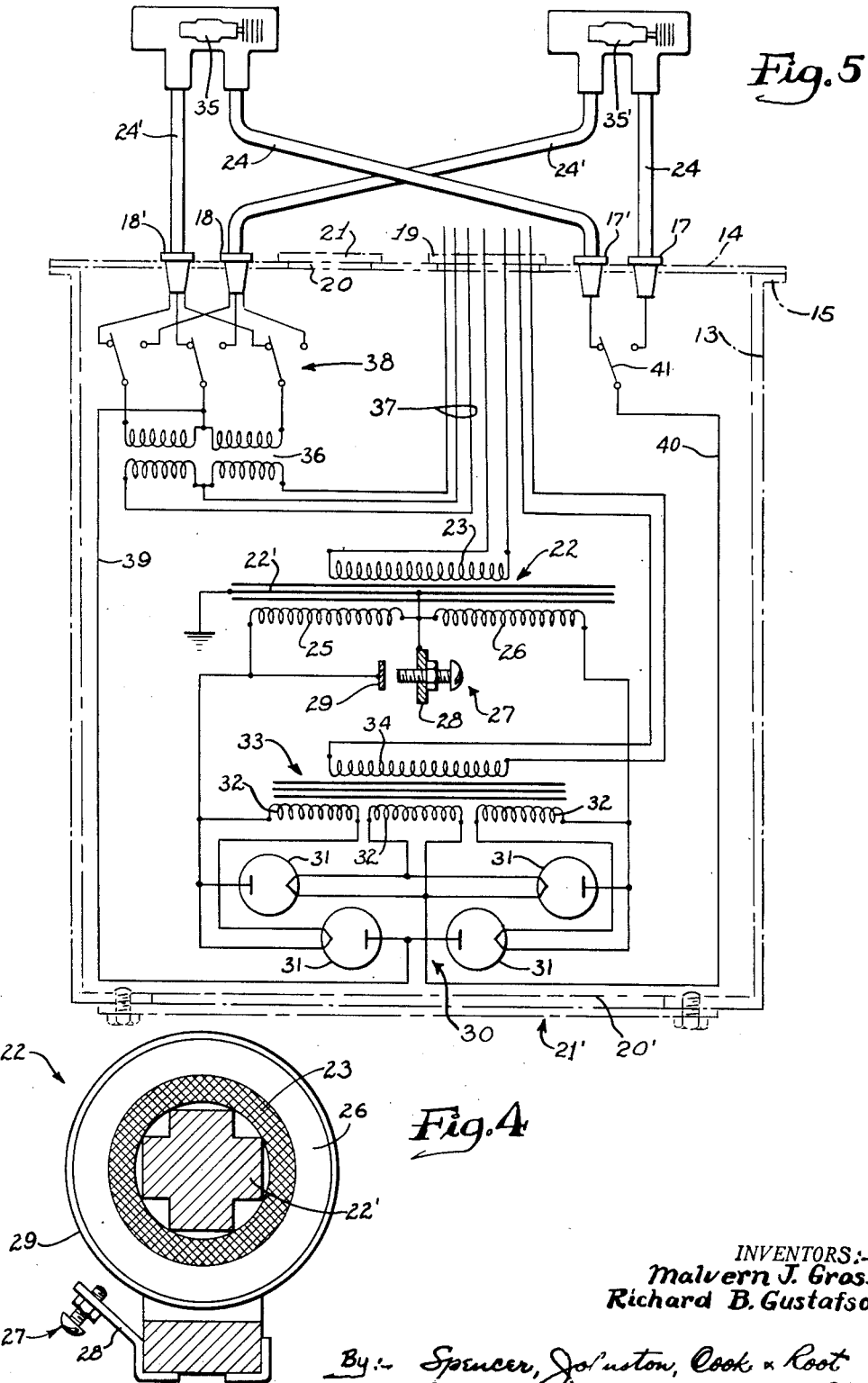

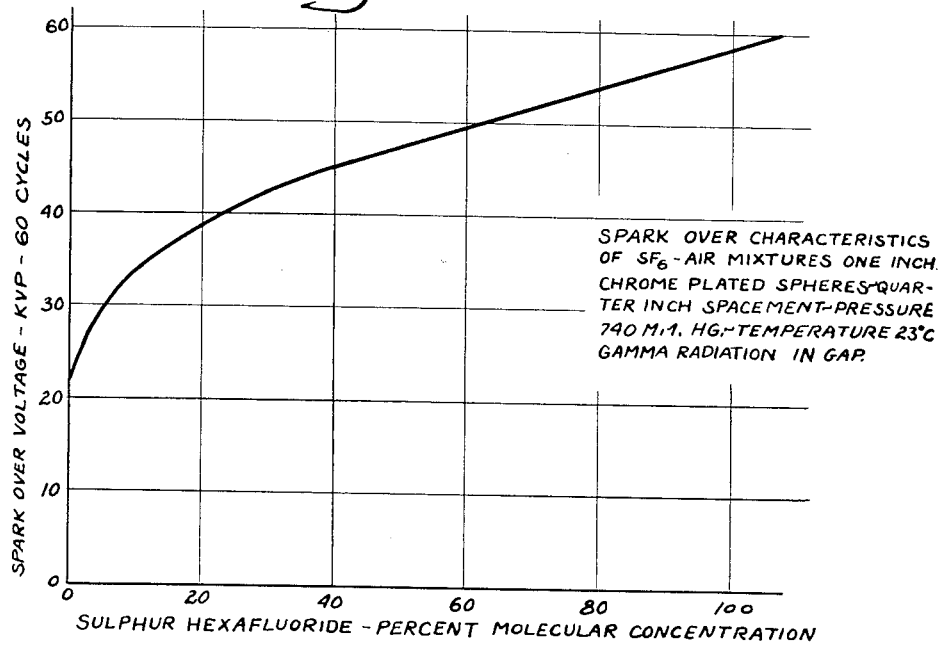
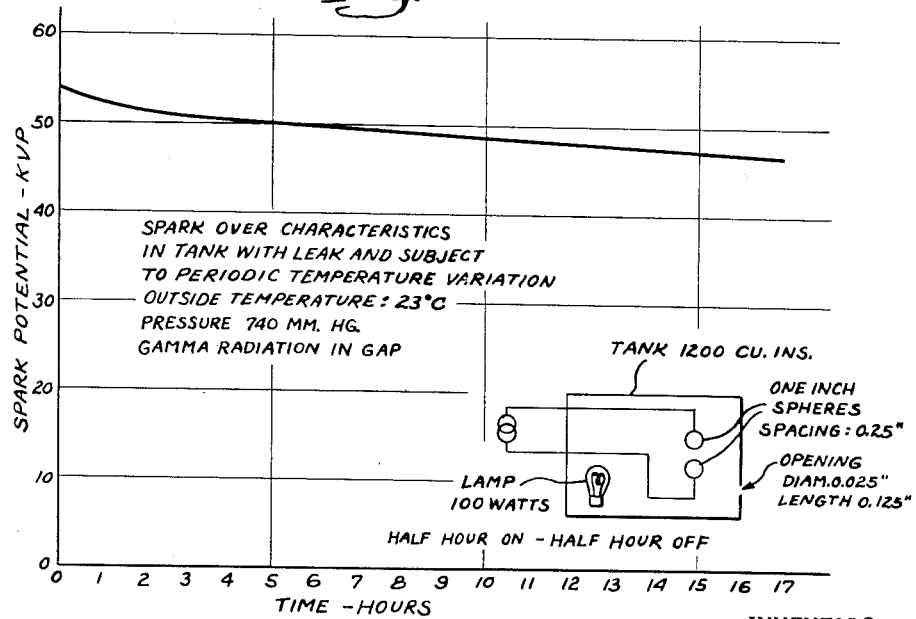

2,756,368

INSULATED ELECTRICAL POWER TRANSLATION APPARATUS

Malvern J. Gross, Wauwatosa, and Richard B. Gustafson, Milwaukee, Wis., assignors to General Electric Company, a corporation of New York Application June 30, 1950, Serial No. 171,515

3 Claims. (Cl. 317—103)

The present invention relates in general to electrical apparatus, especially insulated power translation equipment, including transformers, and other insulated devices, the invention having more particular reference to improvements in the art of insulating such equipment in such fashion as to materially reduce the cost and weight thereof, while improving the capacity of the equipment to function usefully and continuously under adverse conditions, substantially without attention to the condition of the insulation. The invention relates specifically to improvements in high voltage X-ray apparatus, allowing the same to be produced in readily portable form, while improving the general operating utility thereof, without eliminating or sacrificing any necessary diagnostic or therapy facility.

Heretofore it has been customary to employ air, oil or various solid insulating materials for insulating the potential carrying elements of electrical equipment. In some instances, certain gases under high pressure have also been employed for insulating purposes.

Since air, which is normally used as an insulating medium at atmospheric pressure, has relatively low dielectric strength, the relative spacement of potential carrying elements, in air insulated apparatus, is of necessity correspondingly wide; and the over-all size of the equipment is proportionally large.

Where, as is usually the case, the space available for placement of electrical equipment is limited, it is the practice, in the interests of space economy, among other considerations, to utilize insulating media having greater dielectric strength than air in electrical apparatus requiring insulation, thus allowing the apparatus to be more compactly constructed through the disposition therein of potential carrying elements in the more closely spaced relationship allowed when the same are insulated by materials of relatively high dielectric strength.

While the use of liquid or solid insulating media makes for over-all compactness of the insulated equipment, the weight of the insulation is necessarily added to, and thus materially increases the over-all weight of the apparatus. Oil also introduces the hazard of messiness, particularly undesirable where the equipment is installed in a hospital or doctor's office. During repair of oil insulated apparatus it is almost impossible to avoid oil spillage, and spilled oil is difficult to remove from surrounding objects, such as carpets.

Liquid insulation, in addition to its weight, has several undesirable aspects. It is a characteristic of insulating liquids that any dirt particles or small bubbles of air or moisture contained therein tend to line up along a path of maximum electrical tension extending in the liquid, as between a pair of potential carrying elements, at the place of closest separation thereof. Such alinement of particles or bubbles, or both, establishes a path of relatively low dielectric stress, and hence reduces the insulating effect of the oil at the place where arc-over conditions are most likely to occur. As a consequence, the insulating oil must be kept clean, dry and as air-free as possible. If a short circuit or arc-over does occur, serious damage to the equipment is likely, and in any case it is necessary immediately to take the apparatus out of service and, after inspection thereof, either provide an entirely fresh supply of oil, or else filter the previously employed oil to remove all traces of carbonized particles formed in the oil as a result of arc-over.

The employment of gas under appreciable pressure for insulating purposes has numerous disadvantages, including the danger of explosion, the excessive weight of containers required to meet boiler code provisions, the danger of leakage due to the pressure differentials involved, the costly and cumbersome pressure equipment required for charging the equipment with gas at the desired high pressure, and the necessity of providing specially trained personnel for the performance of the pressure charging operation.

X-ray equipment commonly comprises a suitable patient support, a support or stand for an X-ray tube, means for supporting and shifting X-ray sensitive film or fluorescent screens in position, and means for supplying electrical energy for the operation of the tube, including transformers, switches, meters, timers, and such like power translation and control devices. In spite of the above noted undesirable aspects of oil as insulation, it is and for many years has been generally conceded and accepted that oil immersion is the most satisfactory, if not the only suitable expedient available for insulating X-ray equipment, more particularly the tube, and the associated power translation equipment, including transformers, rectifiers and some switches.

As a consequence, X-ray equipment, as now built, is relatively heavy and non-portable, especially when designed to incorporate a complete range of X-ray facilities, including X-ray photography or radiography, X-ray therapy or roentgenography, and X-ray fluoroscopy, as well as serialography and stereoscopy. A considerable portion of the over-all weight of X-ray apparatus is contained in the parts thereof which are oil insulated in accordance with present manufacturing practice, a substantial portion of such weight being provided by the weight of the liquid insulating medium.

A general object of the present invention is to provide readily portable X-ray apparatus containing a complete range of X-ray facilities and adapted to be set up for operation quickly and as rapidly taken down and packed up for shipment in light weight packages of size and weight capable of being handled by one or two human porters; a primary object of the invention being to provide X-ray apparatus adapted for easy transportation, as by air or otherwise, and for air drop delivery as by parachute, to thus make feasible the rapid provision of complete X-ray facilities at remote or relatively inaccessible places, such as advance field hospitals, exploration stations in uninhabited areas, and the like.

To these ends, an important object of the invention is more particularly to provide adequately insulated, portable power translation apparatus of the sort presently provided as oil insulated, substantially non-portable X-ray equipment; a further object being to provide the equipment in compact form adapted for easy human porterage, as well as for delivery at a desired location as by parachute air drop.

A further object of the invention is to eliminate the necessity of employing oil as an insulating medium more especially in relatively high voltage electrical apparatus, and thereby to avoid the several above noted undesirable aspects of oil insulation, without, however, increasing the size and weight of the apparatus nor supplying auxiliary dessicating equipment.

For the accomplishment of the foregoing objects and purposes, the present invention contemplates the employment of a gaseous medium substantially at atmospheric pressure for the insulation of electrical equipment, particularly high voltage power supply equipment for X-ray apparatus. The gaseous medium is utilized not only for weight saving purposes, but the invention also provides for the application of the medium in fashion materially and substantially improving the operating utility of the apparatus, as compared with equivalent oil insulated apparatus heretofore provided. In this connection, a further object of the invention is to provide apparatus insulated with a medium that is appreciably heavier than air, so that it can be charged into the enclosing tank of the apparatus to be insulated merely by pouring the medium into the tank, in manner to displace air upwardly from the tank; a further object being to employ a gaseous medium that is non-inflammable, and non-toxic, and which consequently does not require special care in charging it into the tank.

Another object is to provide apparatus insulated with a gaseous medium at or near atmospheric pressure, thereby allowing a relatively light weight casing to be employed as an enclosing tank for the insulated equipment; a further object being to employ a gaseous medium which maintains its dielectric strength even when mixed with substantial quantities of air, whereby the insulated apparatus may remain effectively in service even after the development of substantial leaks in the tank, the absence of pressure differential within and outwardly of the tank minimizing the tendency of air and gas, respectively, to leak into and out of the tank, so that an extended useful service interval may elapse, after development of a tank leak, before the admixture of air with the insulating medium can take place to an extent sufficient to effectively reduce its dielectric strength to a value at which the equipment becomes inoperable.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a perspective view of a light weight tank enclosed electrical power translation unit embodying the present invention;

Figs. 2 and 3 are perspective views of the apparatus with enclosing tank removed;

Fig. 4 is a sectional view through a portion of the high voltage transformer of the apparatus;

Fig. 5 is a schematic wiring diagram of the apparatus;

Fig. 6 is a graphical illustration of the dielectric characteristics of a gas employed to insulate the equipment in accordance with the invention, when mixed with air; and Fig. 7 is a graphical illustration of the performance of the gas, as employed in accordance with the present invention, when progressively contaminated as a result of air leakage.

To illustrate the invention, the drawings show a power supply unit 11 for furnishing electrical power for the operation of X-ray generator means, although the invention is of course not necessarily limited or restricted to the device to which power is supplied, but may indeed be usefully applied to many types of electrical equipment. The invention, however, is particularly adapted for advantageous application in X-ray equipment, and therefore will be described as so applied.

In this connection, it should be understood that an X-ray tube comprises a vacuum sealed envelope containing an anode forming an electron target, and an electron emitting element operable to emit electrons and positioned to direct the same as a stream of electrons upon the target. X-rays are generated at the target, which is thus constituted as an X-ray source, as the result of electron impingement on the target. X-rays generated at the target of an X-ray tube are emitted thence outwardly of the tube envelope, usually through X-ray transparent windows therein.

The electron emitting element or cathode of an X-ray tube may comprise a filament adapted to be electrically excited, usually at relatively low potential, for the production of electrons, which are driven thence and caused to impinge on the anode target under the influence of a relatively high electrical potential applied and maintained between the anode and cathode. The intensity of the resulting X-rays produced at the anode is a function of the rate of electron impingement on the target, such rate, in turn, being proportional to the rate at which electrons are emitted by the cathode and the magnitude of the electron driving potential applied between the anode and cathode. X-ray intensity thus may be, and commonly is, controlled and adjusted by regulating the anode-cathode potential, and by also regulating the rate of electron emission at the cathode by controlling the excitation of the cathode. Cathode excitation is usually accomplished by causing an electrical current to flow through the cathode filament, and regulation is obtained by adjusting the potential at which electrical energy is applied to the filament.

An X-ray tube may be placed in operation by simultaneously exciting the cathode for electron emission at a selected emission level and applying anode-cathode potential of desired value to produce X-rays of required intensity at the anode target. Ordinarily, the cathode is first energized and may remain continuously in operation, X-rays being produced only during desired intervals under the control of switching means interconnected in the anode-cathode circuit of the tube to control the delivery of electron driving potential between the anode and cathode.

X-ray apparatus may thus be operated from any suitable, usually alternating current power source, by supplying electrical energy from such source to the X-ray tube through suitable power translation means, usually including transformer means for converting the source energy for cathode excitation at relatively low potential, for application in the anode-cathode circuit of the tube at relatively high potential, and for the operation of control equipment, including relays, switches, pilot lamps, meters, and the like.

For the proper operation of the equipment, and in the interests of patient and personnel safety, since the anode-cathode circuit of the apparatus, when in operation, may carry dangerously high electrical potentials of the order of fifty thousand volts, or more, it is essential to adequately insulate the numerous potential carrying elements of the apparatus. In this connection, it has heretofore been considered essential to enclose as much of the high voltage equipment as possible in grounded shock-proof housings filled with insulating oil, and to interconnect the same by means of heavily insulated connecting cables enclosed in grounded sheathings.

The insulation of high voltage apparatus by oil immersion, as heretofore mentioned, makes for heavy substantially non-portable equipment. The necessity of maintaining insulation oil in substantially dirt and moisture free condition materially interferes with and limits the employment of X-ray apparatus in portable fashion, in which the equipment is subjected to rough knockabout use under transient conditions requiring rapid and easy mobility. The ability to perform useful service even when the insulating medium is contaminated with dirt, moisture, or air, is essential in portable X-ray apparatus for military medical service, among others. For effective service under mobile conditions it is not only impractical to employ equipment requiring special care in applying the insulating fluid, but it is even more important to provide apparatus which will continue to function effectively even if the insulating medium should become substantially contaminated either through carelessness or lack of knowledge on the part of untrained personnel, or lack of time for proper care under emergency use conditions.

It is of equal importance that apparatus of the sort herein contemplated be capable of effective performance even after substantial quantities of the insulating fluid is lost because of leaks that may inadvertently develop as a result of damage through rough usage, it being further desirable to provide equipment that does not have to be taken out of service for the purification or reconditioning of the insulating medium in the event of accidental arc-over in service.

It is known, of course, that various gases have electrical insulating qualities; and proposals have heretofore been made for employing the same under pressure in electrical equipment, including X-ray apparatus, for insulating purposes. The present invention, however, teaches the insulating use, at atmospheric pressure, of a gas having certain particular characteristics, including substantial heaviness as compared with air, in manner allowing for the provision of portable apparatus having the advantages and improved serviceability herein described. In this connection, sulphur hexafluoride gas ($SF_6$) has been selected as a satisfactory insulating medium for the accomplishment of the objects of the present invention, without, however, excluding other gases having like or better qualities. Sulphur hexafluoride, of all available substances that have been examined and considered in connection with the present invention, appears to be the one best suited to the accomplishment of the several objectives of the invention. While the dielectric strength of sulphur hexafluoride at atmospheric pressure is not as high as that of good insulating oil, its strength is from two to four times that of air, and it has the following desirable characteristics which render it particularly well adapted for use in obtaining the objects of the invention:

1. Electrical spark-over in the gas does not produce electrical conducting material.
2. The gas is non-inflammable and chemically inert.
3. The gas is stable and does not break down at temperatures below 600° C., well above the breakdown temperature of most insulators.
4. The material sublimates under atmospheric pressure at about —64° C., below which temperature it exists as a solid. It behaves like a perfect gas in the temperature-pressure range in which used in accordance with the teachings of the present invention.
5. For shipment in cylinders, the gas may be liquified under 350 pounds of pressure, so that even at elevated temperature the gas may be stored or shipped, without explosion danger, at cylinder pressure substantially below the shipping pressure of other gases.
6. The weight or density of the gas is about five times that of air, and the rate of diffusion of the gas in air is very slow indeed.
7. The dielectric strength decreases relatively slowly in response to contamination with air, the strength of a mixture containing 50% gas and 50% air having approximately ¾ the strength of pure gas.

By taking advantage of the foregoing characteristics, the present invention provides a power translation system 11 comprising translation elements mounted and supported upon a relatively light weight, preferably metal frame 12 and enclosed in a container 13 of light, thin sheet material. The container may be of cylindrical or other convenient shape, and is preferably closed at the bottom, open at the top, and slightly tapered from top to bottom, to receive the frame and elements thereon. To this end, the frame may be shaped to snugly engage the interior of the container, when in place therein, so as to firmly hold the frame against movement within the container. The top of the frame may comprise a cover plate 14 adapted to close the open top of the container. Means, such as a rim 15 at the top of the container, may be provided for securing the frame in the container, as by bolting or otherwise securing the edges of the cover to the rim. If desired, gasket means may be interposed between the fastened edges of the plate and rim to seal the container.

The cover is preferably provided with handle means 16, by means of which to facilitate placement of the frame in and removal thereof from the casing, and for convenience in moving the container enclosed apparatus. The cover also may be provided with high tension bushing elements 17, 17', 18 and 18'. These bushing elements may open upwardly of the cover for the reception of and electrical connection with cables for the electrical connection of the equipment within the casing with an X-ray tube or tubes disposed outwardly of the casing. The bushings extend within the casing and are electrically connected with the translation elements enclosed therein. The cover may also carry a connection plate 19 through which low voltage connections may be made between a power source outwardly of, and translation elements disposed within, the casing. The cover is also preferably formed with an opening 20, normally closed by means of a readily removable cap or cover 21 of any suitable or preferred character.

The translation equipment on the frame 12 and enclosed in the container may comprise a transformer 22 having a low voltage primary winding 23, having suitable connection terminals on the block 19 and hence adapted to be energized from any suitable primary source of low voltage electrical power, located outwardly of the container, such as a portable generator driven by a gasoline engine or other portable prime mover. If desired, energy delivered from said primary ower source may be applied directly to the transformer winding 23, or may be relayed thereto through any appropriate or desired control circuits, including transformers, auto-transformers, switches, and the like. The transformer 22 also has a high voltage secondary winding, preferably formed as a pair of coils 25 and 26 having a central ground connection on the frame of the transformer, which may be grounded on the frame 19 and hence on the container.

A features of specific novelty is afforded by providing an adjustable spark-over protective gap 27, comprising an adjustable set screw mounted in and so grounded on a portion 28 of the frame. This adjustable screw has a nose or arcing end adjustably spaced from a plate 29 electrically connected with a portion of the high tension secondary circuit of the transformer, whereby to protect the system against excessive voltages therein and assuring arc-over at the gap rather than at some other less desirable place in the system. Any suitable gap forming means may of course be employed. It may be defined merely by suitable spacement of high voltage conductors themselves so that sparking, if it occurs, will take place through the insulating gas alone and not through or over the surface of any solid insulation.

The secondary winding of the transformer 22 may be connected to the anode-cathode circuit of an X-ray tube by means of suitable cables 24, 24', connected in the bushings 17, 17', 18 and 18'. If desired, the tube may thus be connected with the transformer for self-rectified operation, wherein high potential alternating current energy, delivered by the secondary windings 25 and 26, is applied directly to the anode and cathode of the tube, which then becomes conducting and operative as an X-ray generator only during alternate half cycle intervals of the anode-cathode voltage. As shown, however, the high tension secondary windings of the transformer 22 are connected to the input side of a full wave rectifier system 30, comprising the electronic rectifier elements 31 having cathodic filaments energized as by connection with the secondary windings 32 of a filament transformer 33, the primary winding 34 of which is energized from the power source through the connection panel 19 and suitable low voltage control means, outwardly of the casing 13 and preferably including an auto-transformer, which is not shown in the drawing.

The equipment shown is adapted to supply operating power selectively to either of two X-ray tubes 35 and 35', and includes filament transformer means 36 on the frame 12 for supplying exciting energy for the cathodes of the tubes. As shown, the transformer 36 comprises a primary winding with center tap and connection conductors 37, through which the primary winding may be energized from the power source through suitable low voltage control mechanism, preferably including an auto-transformer, which is not shown. The transformer 36 has a secondary winding provided with a center tap and connected with the blades of a triple pole, double throw switch 38, through which the transformer may be selectively connected with the cathode filament of the X-ray tubes 35 and 35'. One side 39 of the anode-cathode power supply circuit may also be connected with one of the blades of the switch 38 for connection with the cathode of the tube with which the transformer is connected. The other side 40 of the anode-cathode power supply circuit is connected with the pole of a double throw switch 41, which operates in unison with the switch 38 to connect the system with one or other of the tubes 35, 35'.

It will be noted that the low voltage equipment comprising the filament transformers 33 and 36, as well as the high voltage elements, including the transformer 22, the rectifier 30 and the selector switches 38 and 41, are enclosed in the container 13, beneath the cover 14, being connected with the tubes through the cables 24 and 24'. The blades of the switches 38 and 41 may be mounted within the container on a simple shaft 42 rockably supported on the frame 12, and means comprising an axially movable stem adapted for connection with an arm on the shaft, and extending thence through a simple shaft seal in the cover, as in the removable cap 21, may be provided for manually actuating the selector switches from outwardly of the container.

The equipment to be insulated thus is enclosed in an exceedingly light weight, relatively flimsy container that is merely sufficiently strong to afford adequate support for the translation equipment, and to afford a protective enclosure therefor. In order to condition the equipment for immediate service, it is merely necessary to uncover the opening 20 and fill the container with sulphur hexafluoride gas, by pouring or otherwise delivering the same into the container, through the opening 20, from a suitable gas transport cylinder. This is best accomplished by inserting a cylinder connected hose through the cover opening 20, and disposing the open end of the hose at or near the bottom of the container. The outlet valve of the gas cylinder may then be opened and gas allowed to enter the container 13, thus filling the same upwardly from the bottom, the gas being about five times the weight of air, until the container 13 is full of gas. This full condition may be ascertained safely and easily by holding a lighted match or flaming taper at the opening 20. When the container is full of gas, the flame will be extinguished by the escape of excess gas through the opening. Thereupon, the cap 21 may be applied to close the opening and the apparatus immediately placed in service, entirely without danger of damage to the equipment. Where oil insulation is employed, it is not only impossible safely to operate comparable equipment for several hours after charging the same with oil, but the oil charging operation is a much slower operation.

While sulphur hexafluoride does not have as high a dielectric strength as oil, it has been found that, for all practical purposes in X-ray transformer design, almost the same voltage spacing, and size of transformer can be used because the gas can be operated closer to its maximum strength due to its greater consistency of breakdown as compared with oil, and because no insulation weakening contaminants are produced as the result of breakdown in the gas. By mounting the rectifier system 30 in the bottom of the tank and by using lower power units than normally used, the heat dissipation problem can be solved without any artificial cooling means. If desired, however, a small fan may be incorporated to circulate the gas in the casing to promote heat dissipation. It is a very simple thing to replace rectifier units without the need of adding additional gas. This is accomplished by providing an opening 20' in the bottom of the tank near the rectifier elements, said opening being normally closed by a removable cover 21'. By inverting the container and uncovering the bottom opening, the rectifier elements may be readily inspected, and quickly removed and replaced if necessary, without material loss or air contamination of the insulating gas. The foregoing procedure is possible because the gas is five times as heavy as air, and it diffuses into air very slowly. Furthermore, mixture of air with the gas changes its dielectric strength only slightly in contrast to the effects of even slight amounts of air or other contamination in oil. The equipment is designed to operate at full voltage with mixtures of gas and air up to 20% of air. The way the apparatus is filled with gas, some contamination is unavoidable. During the gas charging procedure, which requires several minutes, there is bound to be some diffusion of air into the gas.

It is possible, with equipment embodying the present invention, to take equipment that has been standing in the open for long periods of time, with all the dust laden contamination in place thereon, drop it into its container, fill the container with gas, without particular care, and immediately apply high voltage within a matter of minutes or even seconds. With oil insulated equipment the filling time would take much longer, and elementary prudence would call for allowing the transformer to stand for hours before applying high voltage. This brings up another advantage, namely, that dust or other particles, including water droplets, settle out of the gas in the container, whereas in oil they remain distributed, and worse yet, have a tendency to collect at the points of highest electrostatic stress where they can do the most harm.

Another valuable aspect is that it is very simple to seal the container against gas leakage. This is infinitely easier than with oil insulation. The present invention accomplishes adequate sealing under conditions that would give appreciable oil leakage, for example, with chatter marks in the machining of the surface for the gasket. Moreover, puncture of the tank due to any cause can be repaired by adhesive tape or other means, whereas with oil this would be impossible.

It is, of course, not essential to form the arcing gap 27 in the manner illustrated, but the potential carrying elements of the insulated equipment may be so disposed and arranged as to provide a point or points of minimum spacement between relatively insulated potential carrying elements where arc-over is apt to occur, such point of minimum spacement being selected to inhibit arcing between such minimally spaced elements when the intervening space is filled with the insulating medium in pure, unadulterated condition. Such arcing gap provided at a station of minimum spacement of potential carrying elements is ordinarily inherent in any potential carrying equipment as the place in such equipment where arc-over conditions are most likely to become established. Apparatus embodying the present invention normally operates without arc-over at such minimum spacement gap, when the insulating medium is in pure condition substantially uncontaminated by the diffusion of air therein.

The relatively heavy gaseous insulating medium herein contemplated has a relatively slow rate of diffusion with air, and it therefore becomes contaminated with air relatively slowly, even when in an open top container exposed to air. It is therefore possible to open the equipment container 13 for periods sufficient for equipment inspection and replacement of parts without contaminating the insulating medium with air sufficiently to render the equipment inoperative. Furthermore, the gaseous medium will remain sufficiently insulative for operation of the equipment for extended periods, even after the development of small air leaks in the container.

So long as the insulating medium remains substantially free of air within the container, the apparatus, of course, may be operated under its maximum electrical loading without arc-over. As and when the medium becomes contaminated with progressively increasing quantities of air diffused therein, its insulating quality will progressively reduce, as indicated in Fig. 6, until arc-over conditions become established at the gap 27, or any other gap provided at a point of minimum spacement of potential carrying elements. Thereafter, the equipment may be continued in service merely by applying electrical energy to the device at reduced potential.

The equipment may thus continue in useful operation over extended periods as the insulating medium becomes progressively contaminated, merely by reducing the applied operating potential. While it is undesirable to continue the operation of X-ray equipment at voltages corresponding with, say, 50% air contamination of the insulating medium, it is possible to operate the apparatus at substantial voltages, since the insulative capacity of such air mixture of the medium is approximately twice that of air and only 25% less than the insulating capacity of the medium in pure condition.

If desired, a cartridge of activated alumina or other dessicating material may be mounted in the container, as on the under side of the cover, to absorb any moisture such as may enter the container along with contaminant air.

It will be seen from the foregoing that the present invention comprises insulated electrical equipment, particularly high voltage equipment, adapted for care and trouble free, knockabout usage under abusive conditions, the equipment, to that end, being portable and adapted for operation substantially without attention, it being merely necessary initially to charge the equipment with its insulating gas, which can be accomplished very quickly and without special care taken, after which the equipment may be placed immediately in service without any appreciable waiting time for conditioning the same.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Electrical apparatus comprising a tank of light weight, thin gauge material, having an open top, a removable cover closing said open top, whereby to enclose sulphur hexafluoride as an insulating gas within said tank substantially at atmospheric pressure, and a power translation system for energizing an X-ray generating tube, said system embodying devices suspended on said cover and enclosed within said container in position relatively insulated by said gas, and including a high voltage transformer, electronic rectifiers electrically connected therewith, transformer means for energizing the cathodes of said rectifier elements, and a filament transformer for supplying power for energizing the cathode of an X-ray generating tube, said cover being formed with an opening for charging the gas into the tank, said cover being fitted with high voltage bushings for interconnecting said rectifiers and the output side of said filament transformer with an X-ray generating tube outwardly of the tank, and a connection block on said cover providing for the electrical connection of said transformers with a source of electrical energy outwardly of the tank, said cover being provided with handles whereby to facilitate the removal of the cover and cover suspended devices from the tank, and to facilitate porterage of the tank enclosed apparatus.

2. Electrical apparatus as set forth in claim 1, including means forming a sparking gap electrically interconnected in said power translation system within said container and enveloped by said gas.

3. Electrical apparatus as set forth in claim 1, wherein said electronic rectifiers are mounted adjacent the bottom of said tank and detachably connected in said system, said tank being formed with a bottom opening allowing ready access therethrough to said rectifiers, and a cover member for said bottom opening.

References Cited in the file of this patent

UNITED STATES PATENTS

| 1,641,814 | Jones | Sept. 6, 1927 |
| 2,076,252 | Sacks | Apr. 6, 1937 |
| 2,121,630 | Gross et al. | June 21, 1938 |
| 2,221,671 | Cooper | Nov. 12, 1940 |
| 2,221,720 | Prince | Nov. 12, 1940 |
| 2,266,174 | De Graaf | Dec. 16, 1941 |
| 2,307,612 | Westendorp | Jan. 5, 1943 |
| 2,547,996 | Boucher | Apr. 10, 1951 |
| 2,561,738 | Hill | July 24, 1951 |

FOREIGN PATENTS

| 21,159 | Australia | Feb. 21, 1936 |
| 553,569 | Great Britain | May 27, 1943 |
| 599,726 | Great Britain | Mar. 19, 1948 |

OTHER REFERENCES

Camilli et al.: Gen. Electric Review, February 1948, pp. 35 and 41.

Mellor, J. W.: Treatise on Inorganic and Theoretical Chemistry, vol. 10 (1930), page 630.